United States Patent
Kimura et al.

(12) 
(10) Patent No.: US 6,462,451 B1
(45) Date of Patent: Oct. 8, 2002

(54) PERMANENT MAGNET ROTATING ELECTRIC MACHINE

(75) Inventors: Mamoru Kimura, Hitachi; Haruo Koharagi, Taga-gun; Hiroyuki Mikami, Hitachinaka; Miyoshi Takahashi, Hitachi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/793,524

(22) Filed: Feb. 27, 2001

(30) Foreign Application Priority Data

Sep. 22, 2000 (JP) ......................................... 2000-288070

(51) Int. Cl.[7] ................................................. H02K 1/27
(52) U.S. Cl. .............................. 310/156.38; 310/156.53
(58) Field of Search ....................... 310/156.38, 156.39, 310/156.59, 254, 216, 156.53

(56) References Cited

U.S. PATENT DOCUMENTS

| 3,081,412 A | * | 3/1963 | Granier ........................ 310/216 |
| 5,220,228 A | * | 6/1993 | Shibata ........................ 310/254 |
| 5,684,352 A | * | 11/1997 | Mita et al. .................. 310/156 |
| 5,753,991 A | * | 5/1998 | Couture et al. ............. 310/156 |
| 6,044,737 A | * | 4/2000 | Yao et al. ....................... 83/13 |
| 6,049,153 A | * | 4/2000 | Nishiyama et al. .......... 310/156 |

FOREIGN PATENT DOCUMENTS

| JP | 7-255138  | * | 10/1995 | ............. H02K/1/27 |
| JP | 10-126981 | * | 5/1998  | ............. H02K/1/14 |
| JP | 11-089197 | * | 3/1999  | ............ H02K/21/16 |

OTHER PUBLICATIONS

Machine Translation of Murakami, JP 11–089197, Mar. 30, 1999.*

* cited by examiner

*Primary Examiner*—Burton S. Mullins
(74) *Attorney, Agent, or Firm*—Antonelli, Terry, Stout & Kraus, LLP (57) ABSTRACT

The present invention provides a permanent magnet rotating electric machine comprising a stator, a rotor having a rotor core and permanent magnets inserted into the rotor core, wherein the permanent magnets are shaped like an arc convex toward the stator and a flat surface facing toward the stator is provided at a tip end portion of each of the teeth of the stator. With such configuration, the distortion factor of the waveform of an induced voltage in the permanent magnet rotating electric machine.

3 Claims, 8 Drawing Sheets

PERMANENT MAGNET ROTATING ELECTRIC MACHINE

BACKGROUND OF THE INVENTION

1. Field of the Invention

The present invention generally relates to a permanent magnet rotating electric machine.

2. Description of the Related Art

The first reference, i.e. Japanese Unexamined Patent Application Publication No. 10-126981 describes conventional techniques of straight-shaping each of teeth of a stator of a permanent magnet rotating electric machine so as to reduce cogging torque of the permanent magnet rotating electric machine. Further, The second reference, i.e. Japanese Unexamined Patent Application Publication No. 11-089197 describes techniques of enhancing a demagnetization resistance by forming teeth of a stator and permanent magnets of a rotor into predetermined shapes.

Generally, in a permanent magnet rotating electric machine, pulsation of magnetic flux occurs because of the fact that a magnetic flux density does not change in a sinusoidal manner owing to the structure of the rotating electric machine. Thus, according to the techniques described in the first reference, cogging torque is reduced by straight-shaping the teeth of the stator. However, in the case of using such a rotating electric machine as a generator, a distortion factor of the waveform of an induced voltage rather than cogging torque turns into a problem. Incidentally, the distortion factor R (%) of the waveform of an induced voltage is defined by the following equation (1) obtained by Fourier series expansion of the waveform of the induced voltage:

$$R = \frac{\sum_{i=2}^{N} f(i)}{F(l)} \times 100 \quad (1)$$

where f(N) is an effective value of Nth degree frequency component.

However, the first reference does not refer to the distortion factor of the waveform of an induced voltage.

Further, the invention disclosed in the second reference is directed to the improvement of a unique magnetic path for enhancing demagnetization resistance. However, the second reference does not refer to the distortion factor of the waveform of an induced voltage.

Accordingly, in view of the aforementioned problems, an object of the present invention is to provide a permanent magnet rotating electric machine wherein the distortion factor of the waveform of an induced voltage is reduced.

SUMMARY OF THE INVENTION

To achieve the foregoing object, according to an aspect of the present invention, there is provided a permanent magnet rotating electric machine comprising a stator having concentrated windings wound around teeth formed in a stator core, and a rotor having rare earth permanent magnets inserted into a plurality of permanent magnet holes formed in a rotor core. In this rotating electric machine, the permanent magnets are each shaped like an arc facing toward the stator. Moreover, a flat surface facing toward the rotor is provided at a tip end portion of each of teeth of the stator.

Incidentally, the width Wm (deg.) of the permanent magnet is given by $$Wm = C1 \cdot Pr$$

where C1 is a magnet width coefficient and Pr (deg.) is a rotor pole pitch. In this case, preferably, the magnet width coefficient is set so that $0.75 \leq C1 \leq 0.85$. Incidentally, the width Wm of the permanent magnet is defined herein as an angle between two straight lines passing through the center of a rotating shaft and respective ends of the magnet. Further, the width Wt (deg.) of a tip end portion of each of the teeth of the stator is expressed by $$Wt = C2 \cdot Ps$$

where C2 is a stator width coefficient and Ps (deg.) is a stator slot pitch. In this case, preferably, the stator width coefficient is set so that $0.75 \leq C2 \leq 0.85$. Incidentally, the width Wt of the tip end portion of each of the teeth of the stator is defined herein as an angle between two straight lines passing through the center of a rotating shaft and respective ends of the tip end portion of each of the teeth of the stator.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DESCRIPTION OF THE PREFERRED EMBODIMENTS

Hereinafter, the preferred embodiments of the present invention will be described in detail by referring to the accompanying drawings.

Figure 1:
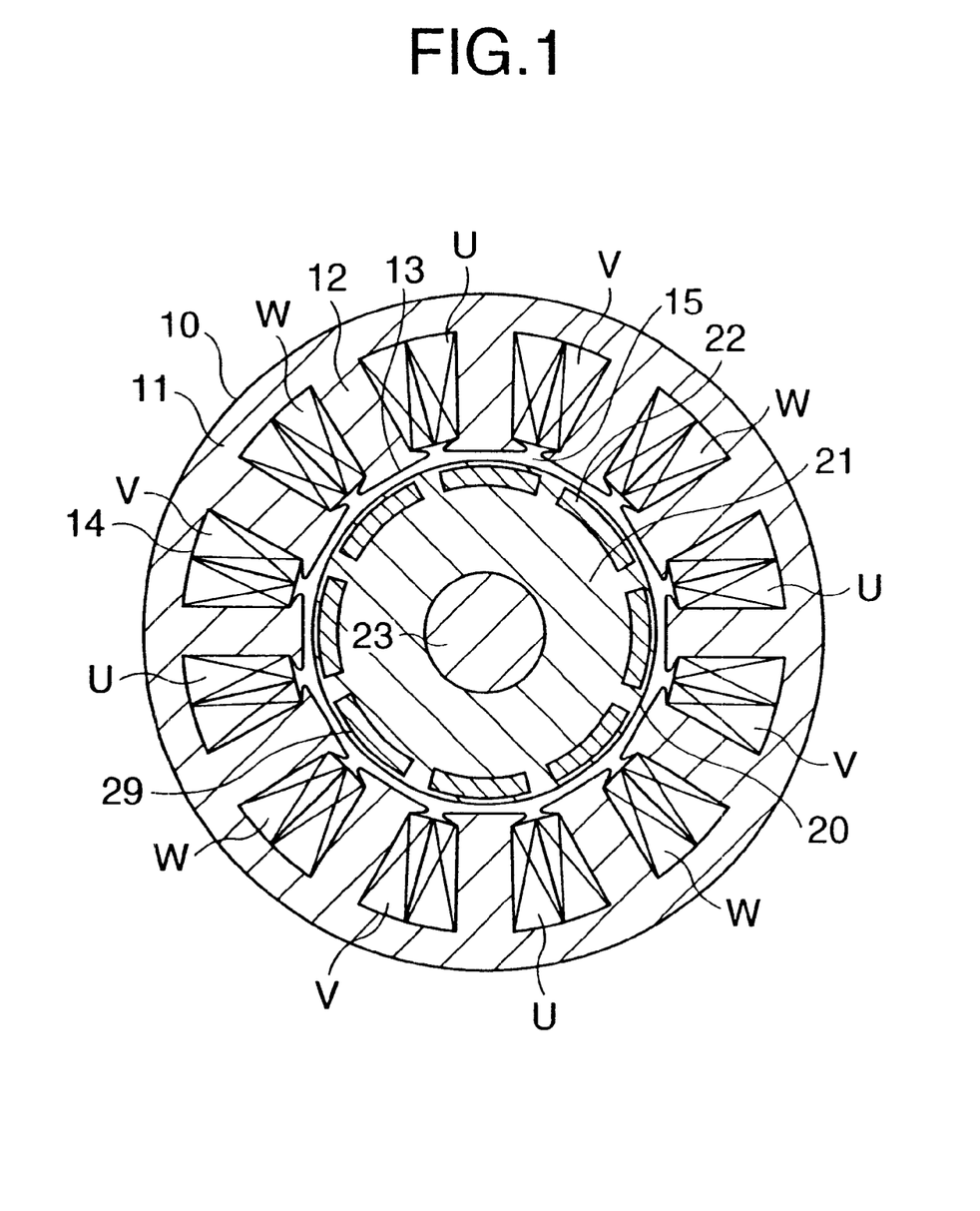
FIG. 1 is a cross sectional view showing a main section of a three-phase eight-pole twelve-slot permanent magnet rotating electric machine that is a first embodiment of the present invention.

FIG. 1 shows a cross sectional view of a three-phase eight-pole twelve-slot permanent magnet rotating electric machine that is a first embodiment of the present invention.

As shown in FIG. 1, a stator 10 is constructed by; concentrated wound U-phase stator windings U, V-phase stator windings V and W-phase stator windings W each provided around corresponding teeth 12 of the stator 10. That is, U-phase stator windings U, V-phase stator windings V and W-phase stator windings W are located in twelve slots 14 formed in an annular stator core 11. A rotor 20 of the rotating electric machine is constructed by fixing a rotor core 21 to a rotor shaft 23 and inserting and incorporating arcuate permanent magnets 22 into permanent magnet inserting holes 29, which are formed by punching the rotor core 21 from a longitudinal direction of the shaft 23. Each permanent magnet 22 is arc-shaped convex toward the stator 20 and arranged in such a manner that N-poles and S-poles are alternately arranged. The rotor 20 is rotatably placed in the stator 10 such that a gap 15 is provided between the tip end portion 13 of each of the teeth and a rotor 20.

Figure 2:
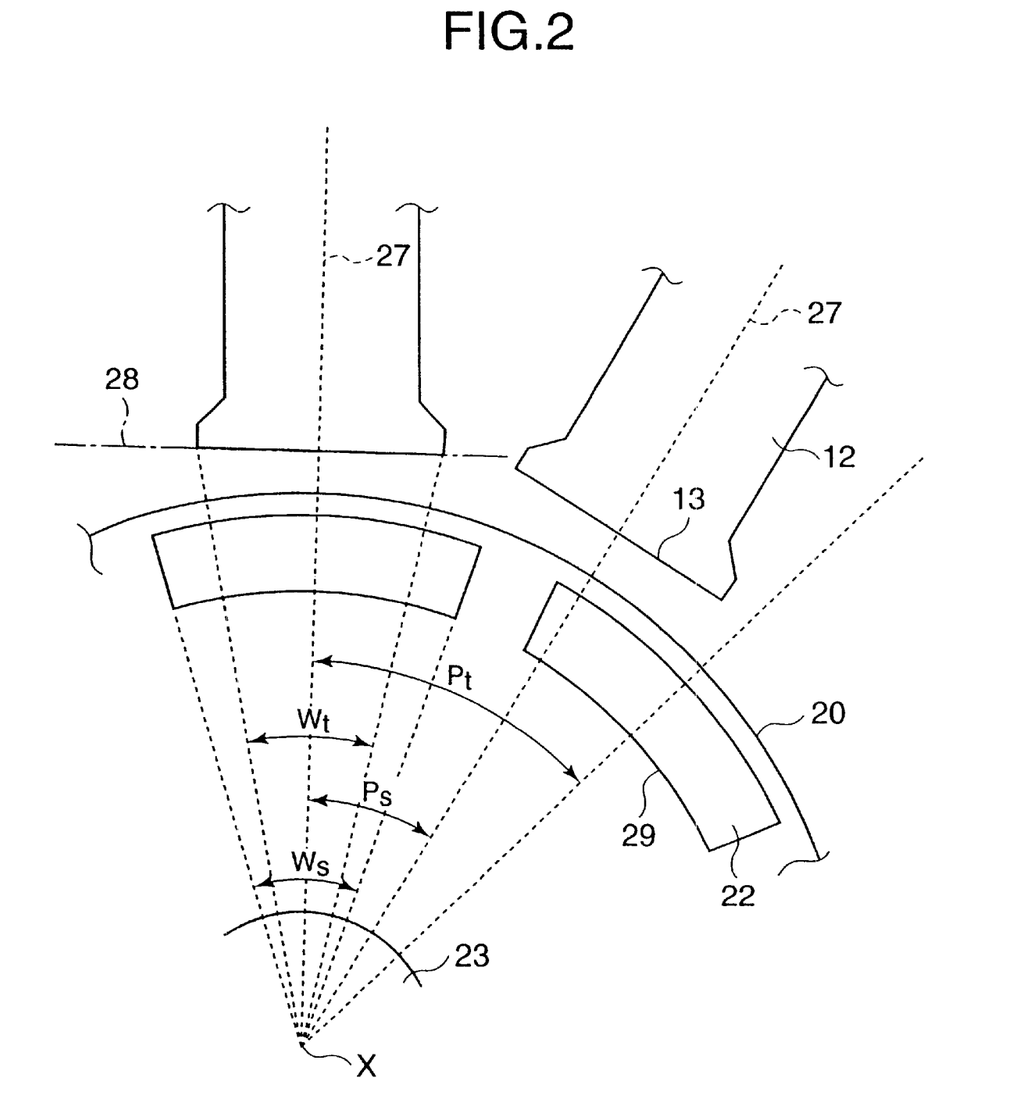
FIG. 2 is an enlarged view of the rotating electric machine shown in FIG. 1.

FIG. 2 shows an enlarged view of the teeth 12 and the rotor 20 of the rotating electric machine according to the first embodiment. A flat surface facing toward the rotor 20 is formed at the tip end portion 13 of each of the teeth 12. That is, the tip end portion 13 of each of the teeth 12 is straight-shaped. This flat surface is orthogonal to the central axis 27 of each of the teeth 12. The central axes 27 each pass through the center X of the rotating shaft 23 and are radially arranged.

Figure 3:
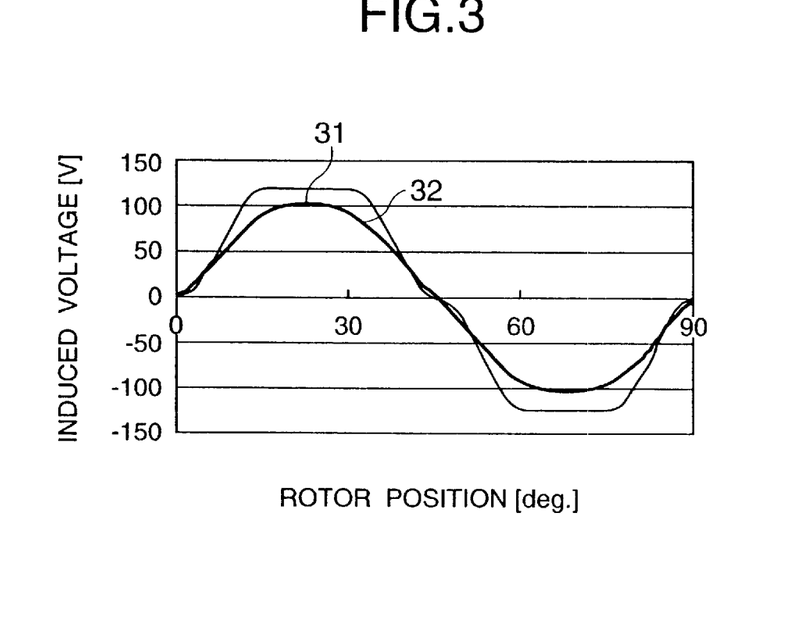
FIG. 3 is a graph illustrating effects of the first embodiment of the present invention.

FIG. 3 shows a graph illustrating the waveform 31 of an induced voltage of the first embodiment of the present invention wherein the flat surface is provided at the tip end portion 13 of each of the teeth 12 of the stator 10, and also illustrating the waveform 32 of an induced voltage in the case of a first comparative example wherein the flat surface is not provided at the tip end portion of each of the teeth of the stator. That is, the tip end portion of the teeth is not straight-shaped.

According to such results shown in this graph, the distortion factors R of such waveforms of induced voltages were calculated. The distortion factor of the waveform 31 was 3.85%, while the distortion factor of the waveform 32 was 14.53%. Thus, the distortion factor is reduced to about (¼) that of the first comparative example by providing a flat surface at the tip end portion 13 of each of the teeth of the stator. This is owing to the facts that the width of the gap 15 is made to be uneven over the circumference of the rotor and vary in the circumferential direction by providing the flat surface facing toward the rotor 7, on the tip end portion 13 of each of the teeth of the stator, and that thus the magnetic flux density in the gap 15 changes in a sinusoidal manner, and that the waveform of the induced voltage becomes sinusoidal. Consequently, the distortion factor of the waveform of the induced voltage is reduced.

Further, as shown in FIG. 2, the width Wm (deg.) of the permanent magnet 22 is given by $$Wm = C1 \cdot Pr$$

where C1 is a magnet width coefficient and Pr (deg.) is a rotor pole pitch. Moreover, the magnet width coefficient is set so that $0.75 \leq C1 \leq 0.85$. Incidentally, the rotor pole pitch Pr(deg.) is obtained by dividing 360 (deg.) by the number of rotor poles. In the case of this embodiment, the number of the poles is 8, so that Pr=45 (deg.).

Further, the width Wt (deg.) of a tip end portion of each of the teeth of the stator is expressed by $$Wt = C2 \cdot Ps$$

where C2 is a stator width coefficient and Ps (deg.) is a stator slot pitch. In this case, the stator width coefficient C2 is set so that $0.75 \leq C2 \leq 0.85$. Incidentally, the stator slot pitch Ps(deg.) is obtained by dividing 360 (deg.) by the number of stator slots. In the case of the first embodiment, the number of the slots is 12, so that Ps=30 (deg.).

Hereinafter, the reasons for setting the magnet width coefficient C1 and the stator width coefficient C2 in such a manner are described with reference to FIG. 4.

Figure 4:
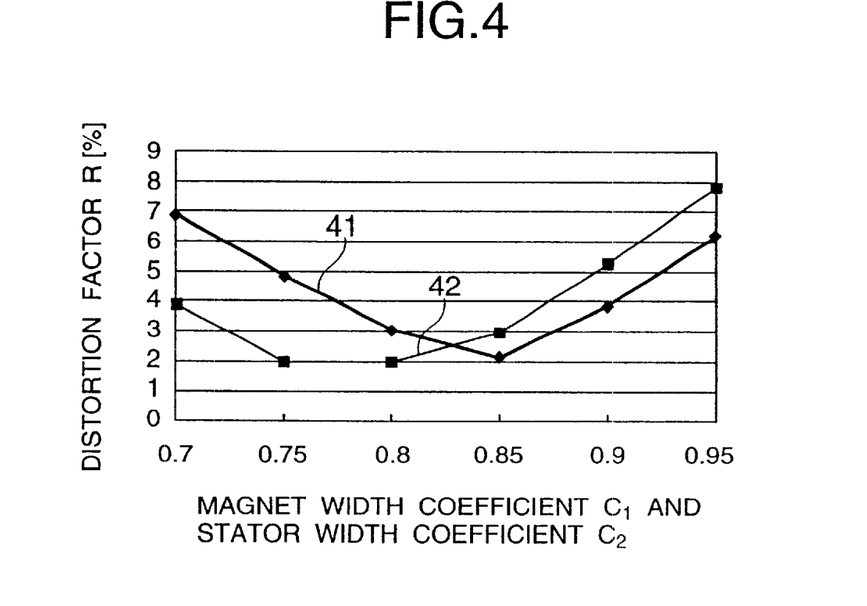
FIG. 4 is a graph illustrating effects of changing the width of each of magnets and that of a tip end portion of each of teeth of a stator of the first embodiment of the present invention.

FIG. 4 shows a graph illustrating changes in the distortion factor R of the waveform of the induced voltage in the cases of changing the magnet width coefficient C1 and the stator width coefficient C2. As shown in FIG. 4, a curve 41 indicates the change in the distortion factor in the case of changing the magnet width coefficient C1, while a curve 42 indicates the change in the distortion factor in the case of changing the stator width coefficient C2. The curve 41 indicates that the distortion factor takes a minimum value 2.12% when the magnet width coefficient C1 is 0.85. Thus, the value of the distortion factor R is reduced to about (1/7) the value of 14.53 of the distortion factor of the waveform 32. The curve 42 indicates that the distortion factor takes a minimum value 2.0% when the stator width coefficient C1 is 0.75 to 0.85. Thus, the value of the distortion factor R is reduced to about (1/7) the value of 14.53 of the distortion factor of the waveform 32. The values of these coefficients are set in such a way as to be simultaneously in such two ranges. Thus, the magnet width coefficient C1 is set so that $0.75 \leq C1 \leq 0.85$. Moreover, the stator width coefficient C2 is set so that $0.75 \leq C2 \leq 0.85$. Consequently, the distortion factor of the waveform of an induced voltage is considerably reduced.

Figure 5:
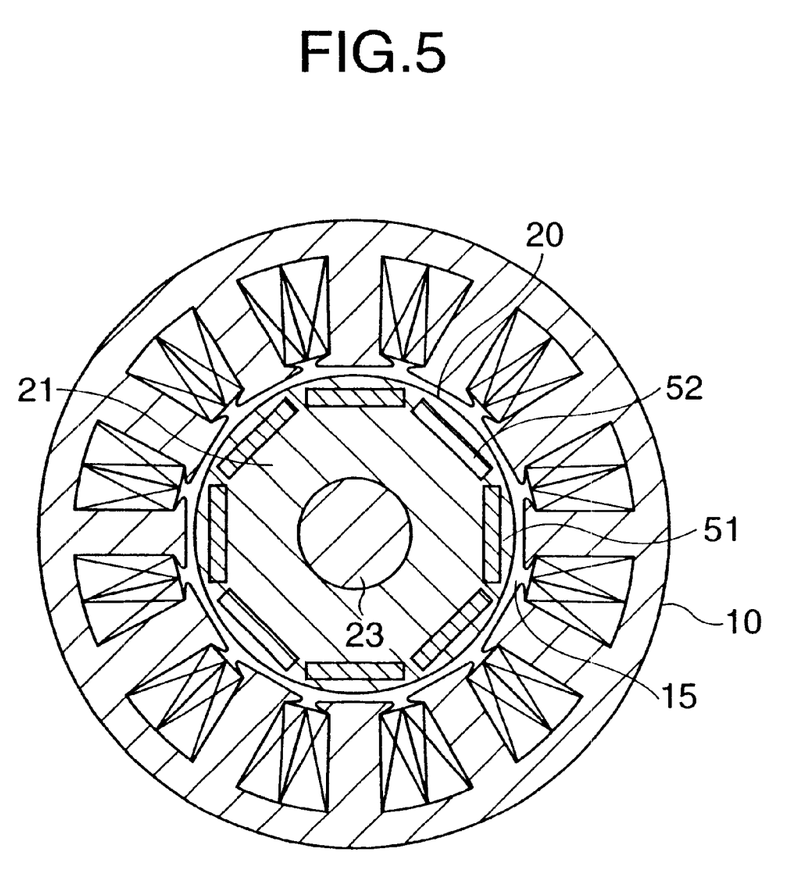
FIG. 5 is a cross sectional view showing a main section of a permanent magnet rotating electric machine that is a second embodiment of the present invention.

FIG. 5 shows a cross sectional view of a second embodiment of the present invention applied to a three-phase eight-pole twelve-slot permanent magnet rotating electric machine employing straight-shaped or rectangular permanent magnets. In FIG. 5, like reference numerals designate like constituent elements shown in FIG. 1. Thus, the description of such constituent elements is omitted herein.

The second embodiment differs from the first embodiment in that eight straight-shaped or rectangular-shaped permanent magnets 52 are inserted and incorporated into permanent magnet inserting holes 51, which are formed by punching the rotor core 21 from an axial direction. Each permanent magnet 52 are arranged so that N-poles and S-poles are alternately arranged.

Figure 6:
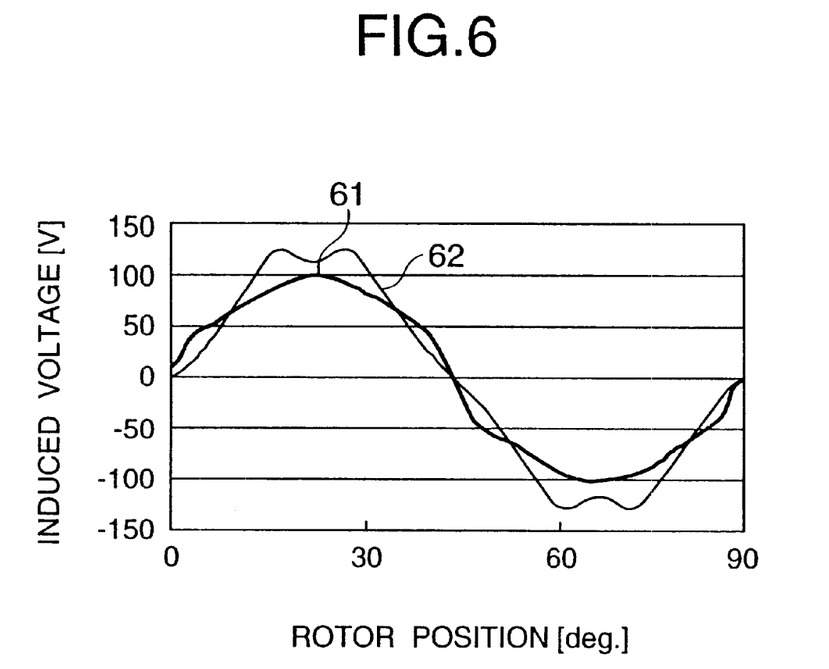
FIG. 6 is a graph illustrating effects of the second embodiment of the present invention.

FIG. 6 shows a graph illustrating the waveform 61 of an induced voltage in the second embodiment and the waveform 62 of an induced voltage in a second comparative example wherein a flat surface is not provided at the tip end portion of each of the teeth of the stator.

According to such results shown in this graph, the distortion factors R of such waveforms of induced voltages were calculated. The distortion factor of the waveform 61 was 9.08%, while the distortion factor of the waveform 62 was 16.92%. Thus, the distortion factor is reduced to about (½) that of the second comparative example providing a flat surface at the tip end portion 13 of each of the teeth of the stator. This is owing to the facts that the width of the gap 15 is made to be uneven over the circumference of the rotor and vary in the circumferential direction by providing the flat surface facing toward the rotor 7, on the tip end portion 13 of each of the teeth 12 of the stator 10, and that thus the magnetic flux density in the gap 15 changes in a sinusoidal manner, and that the waveform of the induced voltage becomes sinusoidal. Consequently, the distortion factor of the waveform of the induced voltage is reduced.

Figure 7:
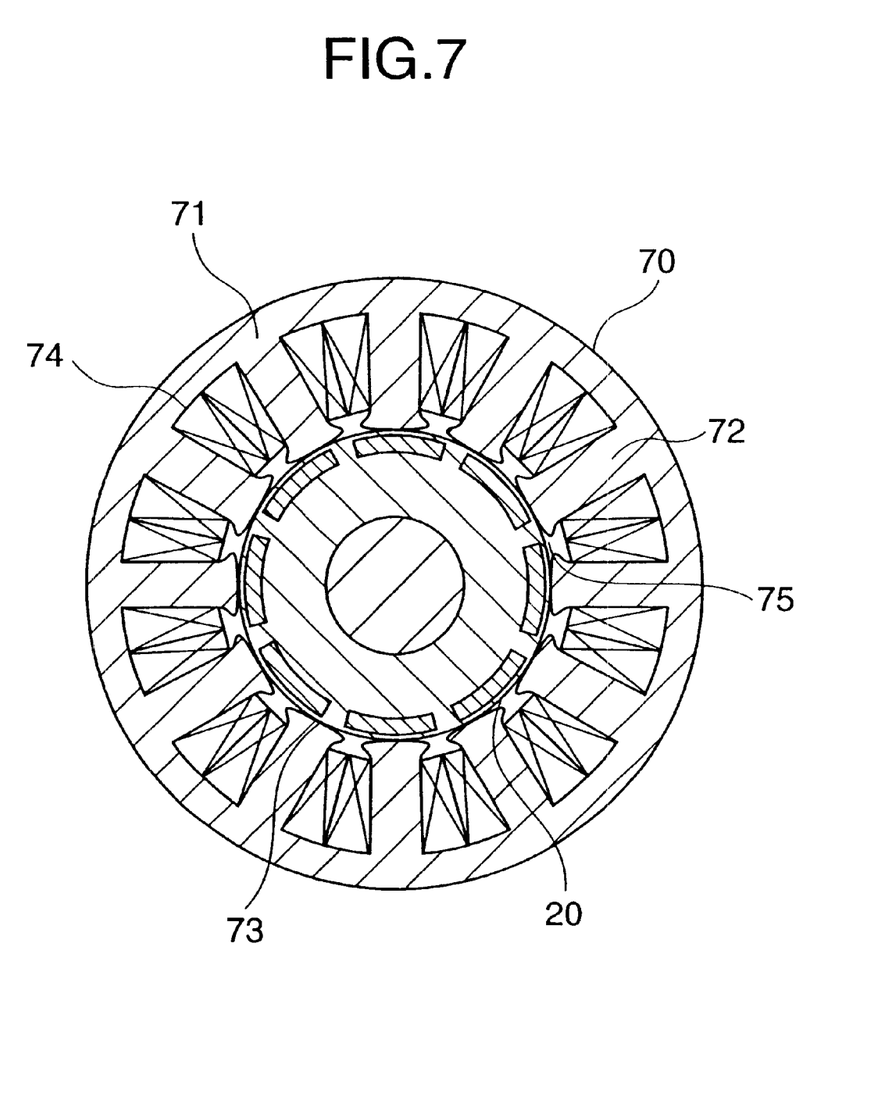
FIG. 7 is a cross sectional view showing a main section of a permanent magnet rotating electric machine that is a third embodiment of the present invention.

FIG. 7 shows a cross sectional view of a third embodiment of the present invention applied to a three-phase eight-pole twelve-slot permanent magnet rotating electric machine employing straight-shaped or rectangular permanent magnets. In FIG. 7, like reference numerals designate like constituent elements shown in FIG. 1. Thus, the description of such constituent elements is omitted herein.

The third embodiment differs from the first embodiment in that a stator 70 is constructed by concentrated wound U-phase stator windings U, V-phase stator windings V and W-phase stator windings W each provided around corresponding teeth 72 of the stator 70. That is, U-phase stator windings U, V-phase stator windings V and W-phase stator windings W are located in twelve slots 74 formed in an annular stator core 71. A rotor 20 is rotatably placed in the stator 70 such that a gap 75 is provided between the tip end portion 73 of the teeth and the rotor 20.

Figure 8:
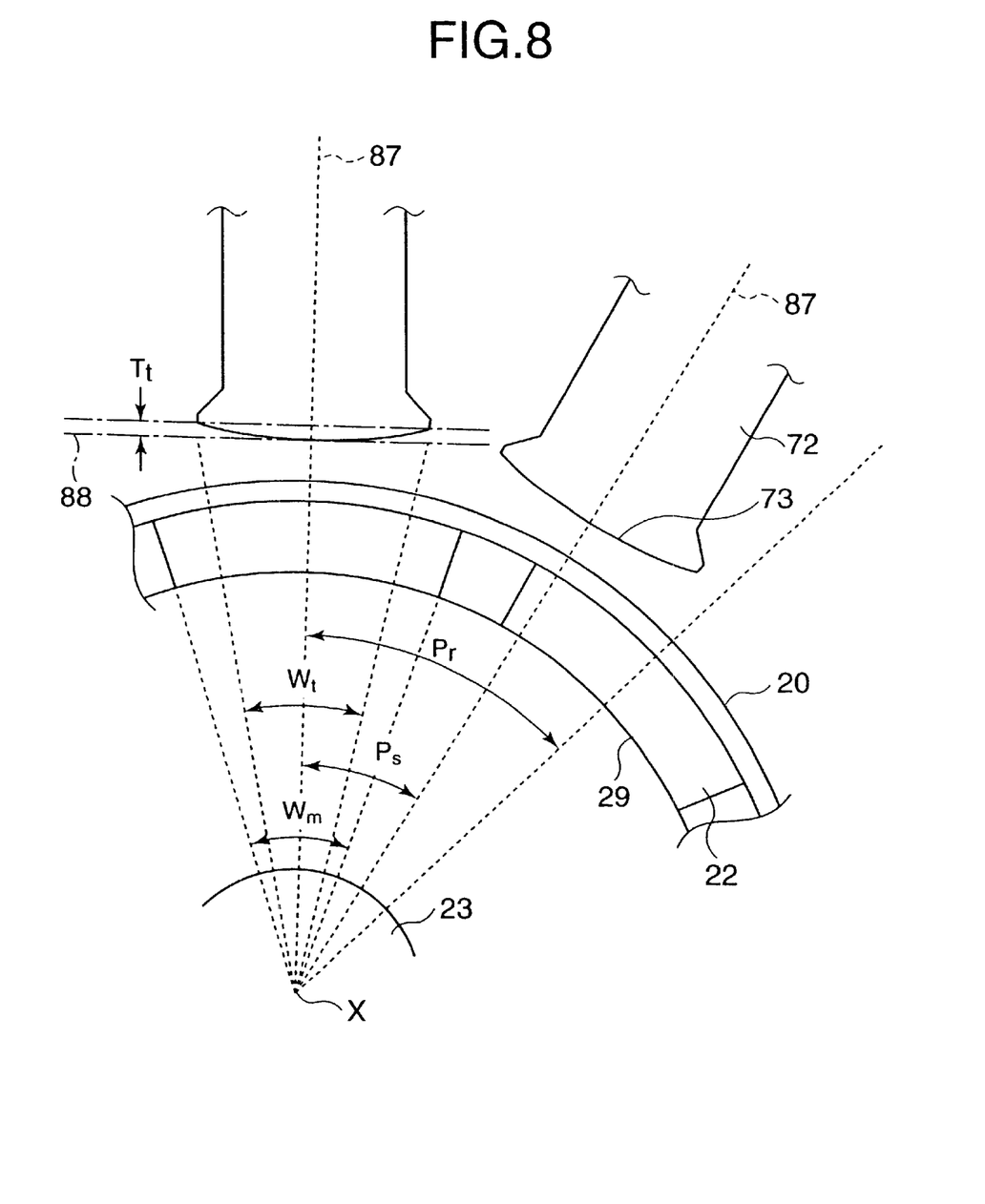
FIG. 8 is an enlarged view of the rotating electric machine shown in FIG. 7.

FIG. 8 shows an enlarged view of the teeth 72 and the rotor 20 of the rotating electric machine according to the third embodiment. A convex surface facing toward the rotor 20 is formed at the tip end portion of each of the teeth 72. That is, as shown in FIG. 8, the tip end portion 73 of each of the teeth 72 is arc-shaped from the cross sectional view. This arc is tangent to a straight line 88 orthogonal to the central axis 87 of each of teeth 12.

Figure 9:
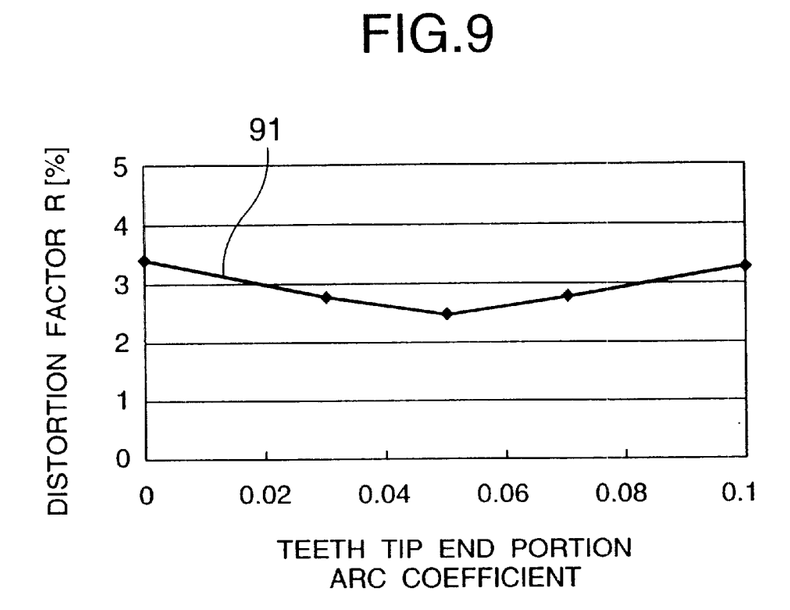
FIG. 9 is a graph illustrating effects of changing the radius of arc at a tip end portion of teeth of a stator core of the third embodiment of the present invention.

Further, the interval Tt between a first straight line crossing both ends of the arc and a second straight line 88 which is parallel to the first line and tangent to the arc is expressed by $$Tt = Cc \cdot Wt$$

where Cc is a tooth tip end portion arc coefficient and Wt is a width of tip end portion of the tooth. In this case, the tooth tip end portion arc coefficient Cc is set so that $0 \leq Cc \leq 0.1$. Hereinafter, the reason for setting the tooth tip end portion arc coefficient Cc in such a manner is described with reference to FIG. 9.

FIG. 9 shows a graph illustrating changes in the distortion factor R of the waveform of the induced voltage in the case of changing the tooth tip end portion arc coefficient Cc. As shown in FIG. 9, a curve 91 indicates the change in the distortion factor in the case of changing the tooth tip end portion arc coefficient Cc. The curve 91 indicates that the distortion factor takes a minimum value 2.5% when the tooth tip end portion arc coefficient Cc is 0.03. Thus, the value of the distortion factor R is reduced to about (1/7) the value of 14.53 of the distortion factor of the waveform 32. Further, the distortion factor R is equivalent to the distortion factor of the first embodiment when the tooth tip end portion arc coefficient Cc is 0.1. The tooth tip end portion arc coefficient is therefore set so that $0 \leq Cc \leq 0.1$. Consequently, the distortion factor of the waveform of an induced voltage is considerably reduced.

As described above, according to the present invention, an improved permanent magnet rotating electric machine wherein the distortion factor of the waveform of an induced voltage is considerably reduced is provided by providing a flat or convex surface facing toward the rotor at a tip end portion of each of the teeth of the stator.

Although the preferred embodiments of the present invention have been described above, it should be understood that the present invention is not limited thereto and that other modifications will be apparent to those skilled in the art without departing from the sprint of the invention.

The scope of the present invention, therefore, should be determined solely by the appended claims.

What is claimed is:

1. A permanent magnet rotating electric machine comprising a stator having concentrated windings wound around teeth formed in a stator core, and a rotor having rare earth permanent magnets inserted into a plurality of permanent magnet holes formed in a rotor core, wherein said permanent magnets are each shaped like an arc convex toward said stator and a flat surface facing toward said rotor is provided at a tip end portion of said teeth of said stator, wherein a width Wm (deg.) of each of said permanent magnets is given by $$Wm = C1 \cdot Pr$$

where C1 is a magnet width coefficient and Pr (deg.) is a rotor pole pitch, and wherein the magnet width coefficient is set so that $0.75 \leq C1 \leq 0.85$.

2. A permanent magnet rotating electric machine comprising a stator having concentrated windings wound around teeth formed in a stator core, and a rotor having rare earth permanent magnets inserted into a plurality of permanent magnet holes formed in a rotor core, wherein said permanent magnets are each shaped like an arc convex toward said stator and a flat surface facing toward said rotor is provided at a tip end portion of said teeth of said stator, wherein a width Wt (deg.) of a tip end portion of each of said teeth of said stator is expressed by $$Wt = C2 \cdot Ps$$

where C2 is a stator width coefficient, and Ps (deg.) is a stator slot pitch, and wherein the stator width coefficient is set so that $0.75 \leq C2 \leq 0.85$.

3. A permanent magnet rotating electric machine comprising a stator having concentrated windings wound around teeth formed in a stator core, and a rotor having rare earth permanent magnets inserted into a plurality of permanent magnet holes formed in a rotor core, wherein said permanent magnets are each shaped like an arc convex toward said stator and a convex surface facing toward said rotor is provided at a tip end portion of said teeth of said stator, wherein an interval Tt between a first straight line crossing both ends of an arc comprising said convex surface and a second straight line which is parallel to said first straight line and tangent to said arc is expressed by $$Tt = Cc \cdot Wt$$

where Cc is a tooth tip end portion arc coefficient and Wt is a width of said tip end portion of said tooth, and wherein said tooth tip end portion arc coefficient Cc is set so that $0 \leq Cc \leq 0.1$.

* * * * *